(12) United States Patent
Dai et al.

(10) Patent No.: US 11,680,487 B2
(45) Date of Patent: Jun. 20, 2023

(54) ADDITIVELY MANUFACTURED RADIAL TURBINE ROTOR WITH COOLING MANIFOLDS

(71) Applicant: Hamilton Sundstrand Corporation, Charlotte, NC (US)

(72) Inventors: Zhongtao Dai, West Hartford, CT (US); Ram Ranjan, West Hartford, CT (US); Robert H. Dold, Monson, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/453,804

(22) Filed: Nov. 5, 2021

(65) Prior Publication Data

US 2023/0146859 A1 May 11, 2023

(51) Int. Cl.
*F01D 5/04* (2006.01)
*B33Y 80/00* (2015.01)

(52) U.S. Cl.
CPC ............. *F01D 5/046* (2013.01); *F01D 5/048* (2013.01); *B33Y 80/00* (2014.12); *F05D 2240/24* (2013.01); *F05D 2260/201* (2013.01)

(58) Field of Classification Search
CPC ............. F05D 2230/53; F05D 2250/15; F05D 2210/42; F05D 2240/24; F05D 2240/127; F05D 2240/30; F05D 2240/307; F05D 2250/11; F05D 2260/14; F05D 2260/201; F05D 2250/27; F05D 2250/25; F04D 29/284; F04D 29/023; F04D 29/2227; F04D 29/242; F04D 17/167; F04D 29/28; F04D 29/30; F04D 25/04; F04D 29/2222; F04D 29/162; F04D 29/026; F04D 29/4213; F04D 29/2255; F04D 29/225; F04D 29/685; F01D 5/048; F01D 5/045; F01D 5/046; F01D 5/04; F01D 5/18; F01D 5/088; F01D 5/066; F01D 9/045; F01D 5/14; F05B 2240/33; B33Y 80/00
See application file for complete search history.

(56) References Cited

U.S. PATENT DOCUMENTS 4,604,780 A 8/1986 Metcalfe
8,814,509 B2 * 8/2014 Moore .................... F04D 29/58
415/199.2

(Continued)

*Primary Examiner* — Eric J Zamora Alvarez
(74) *Attorney, Agent, or Firm* — Kinney & Lange, P.A.

(57) ABSTRACT

A turbine rotor includes a base and a plurality of blades. A central nose is radially inward of the blades and defines an axis of rotation. A plurality of cooling manifolds is disposed within the turbine rotor and includes impingement cooling jets extending through a rear surface of the turbine rotor. An internal cooling manifold extends radially inward of the impingement cooling jets and extends between the base and the rear surface of the turbine rotor. A central nose cooling manifold extends into the central nose and is fluidically connected to the internal cooling manifold. A base cooling manifold is fluidically connected to the central nose manifold and extends radially outward from the central nose cooling manifold. A blade cooling manifold is fluidically connected to the base cooling manifold and extends within the blade. Trailing edge jets extend from the blade cooling manifold and through the trailing edge of blades.

20 Claims, 10 Drawing Sheets

(56) References Cited

U.S. PATENT DOCUMENTS

| | | |
|---|---|---|
| 9,115,586 B2 | 8/2015 | Jan et al. |
| 9,476,305 B2 * | 10/2016 | Jan .......................... F01D 5/081 |
| 10,260,355 B2 | 4/2019 | Smoke et al. |
| 10,584,721 B2 * | 3/2020 | Kerth .................... F04D 17/122 |
| 10,731,664 B2 * | 8/2020 | Iurisci ................... F04D 29/441 |
| 2017/0107821 A1 | 4/2017 | Schwarz |

* cited by examiner

ADDITIVELY MANUFACTURED RADIAL TURBINE ROTOR WITH COOLING MANIFOLDS

STATEMENT OF GOVERNMENT INTEREST

This invention was made with government support under contract number DE-EE0009138, awarded by the Department of Energy. The government has certain rights in the invention.

BACKGROUND

This application relates to a radial turbine, and in particularly to a radial turbine with cooling passages.

As discussed herein, a radial turbine that includes a base with a plurality of blades extending radially outwardly therefrom. High-pressure working fluid is delivered into a central area of the turbine from a volute, flows through guide vanes, stators, or nozzles, and expands as it contacts the turbine blades, driving the rotor to rotate. Downstream of the rotor, the working fluid leaves a housing for the turbine through an outlet. The efficiency of this turbomachinery depends on turbine inlet temperature and pressure. As the turbine inlet temperature increases, cooling of the turbine can be an enabling technology. Turbine cooling fluid or coolant can be the same type of fluid as turbine working fluid.

SUMMARY

In one example, a turbine rotor of a radial flow turbine includes a base and a plurality of blades circumferentially spaced about an axis of rotation and extending from the base. Each blade extends radially outward from the base to a tip and chordwise from a leading edge to a trailing edge. Each blade has a suction side and a pressure side. A central nose is radially inward of the blades and defines an axis of rotation. A plurality of cooling manifolds is disposed within the turbine rotor and includes impingement cooling jets circumferentially disposed around and extending through a rear surface of the turbine rotor. An internal cooling manifold extends radially inward of the impingement cooling jets and extends between the base and the rear surface of the turbine rotor. A central nose cooling manifold extends into the central nose and is fluidically connected to the internal cooling manifold. A base cooling manifold is fluidically connected to the central nose manifold and extends radially outward from the central nose cooling manifold along the base adjacent to the suction side of the blade. A blade cooling manifold fluidically connected to the base cooling manifold extends within the blade from the base to the tip of the blade and extends from the leading edge toward the trailing edge of the blade. Trailing edge exit jets extend from the blade cooling manifold and through the trailing edge of each blade of the plurality of blades.

In another example, a turbine module includes a turbine rotor and a housing. The turbine rotor includes a base and a plurality of blades circumferentially spaced about an axis of rotation and extending from the base. Each blade extends radially outward from the base to a tip and chordwise from a leading edge to a trailing edge. Each blade also has a suction side and a pressure side. The base and the blades curve such that radially outward portions of the base and the blades extend more in a radial direction than in an axial direction. Radially central portions of the base and the blades extend similarly in the radial direction and the axial direction. A central nose radially inward of the plurality of blades defines the axis of rotation. A plurality of cooling manifolds are disposed within the turbine rotor. The cooling manifolds include impingement cooling jets circumferentially disposed around and extending through a rear surface of the turbine rotor. An internal cooling manifold extends radially inward of the impingement cooling jets and extends between the base and the rear surface of the turbine rotor. A central nose cooling manifold extends into the central nose and is fluidically connected to the internal cooling manifold. A base cooling manifold is fluidically connected to the central nose manifold and extends radially outward from the central nose cooling manifold along the base adjacent the suction side of the blade. A blade cooling manifold is fluidically connected to the base cooling manifold extends within the blade from the base to tip of the blade and extends from the leading edge toward the trailing edge of the blade. Trailing edge exit jets extend from the blade cooling manifold and through the trailing edge of the blades. The housing includes a shaft mounted within the housing. The housing and a rear surface of the turbine rotor define a cooling gap.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to an additively manufactured radial turbine with cooling manifolds. To increase the efficiency of a turbine the inlet temperature of the turbine should be increased. As the temperature of a working fluid at an inlet of the turbine rotor reaches the thermal limits (approximately 800° C.) of the materials from which the turbine rotor is made, the turbine rotor must be cooled to preserve the mechanical integrity and durability of the turbine rotor. Traditional manufacturing techniques make it difficult to develop low-weight, effective cooling passages disposed within the turbine rotor. Additive manufacturing provides additional manufacturing capabilities that enable the cooling manifolds to be disposed within the rotor blade. However, powder entrapment and turbine rotor integrity issues arise when current designs of rotor blades with integrated cooling are additively manufactured. The cooling manifolds disclosed herein permit more reliable additive manufacturing while providing structural support and cooling to the turbine rotor. The turbine rotor with cooling manifolds will be discussed with reference to FIGS. 1A-2G.

Figure 1A:
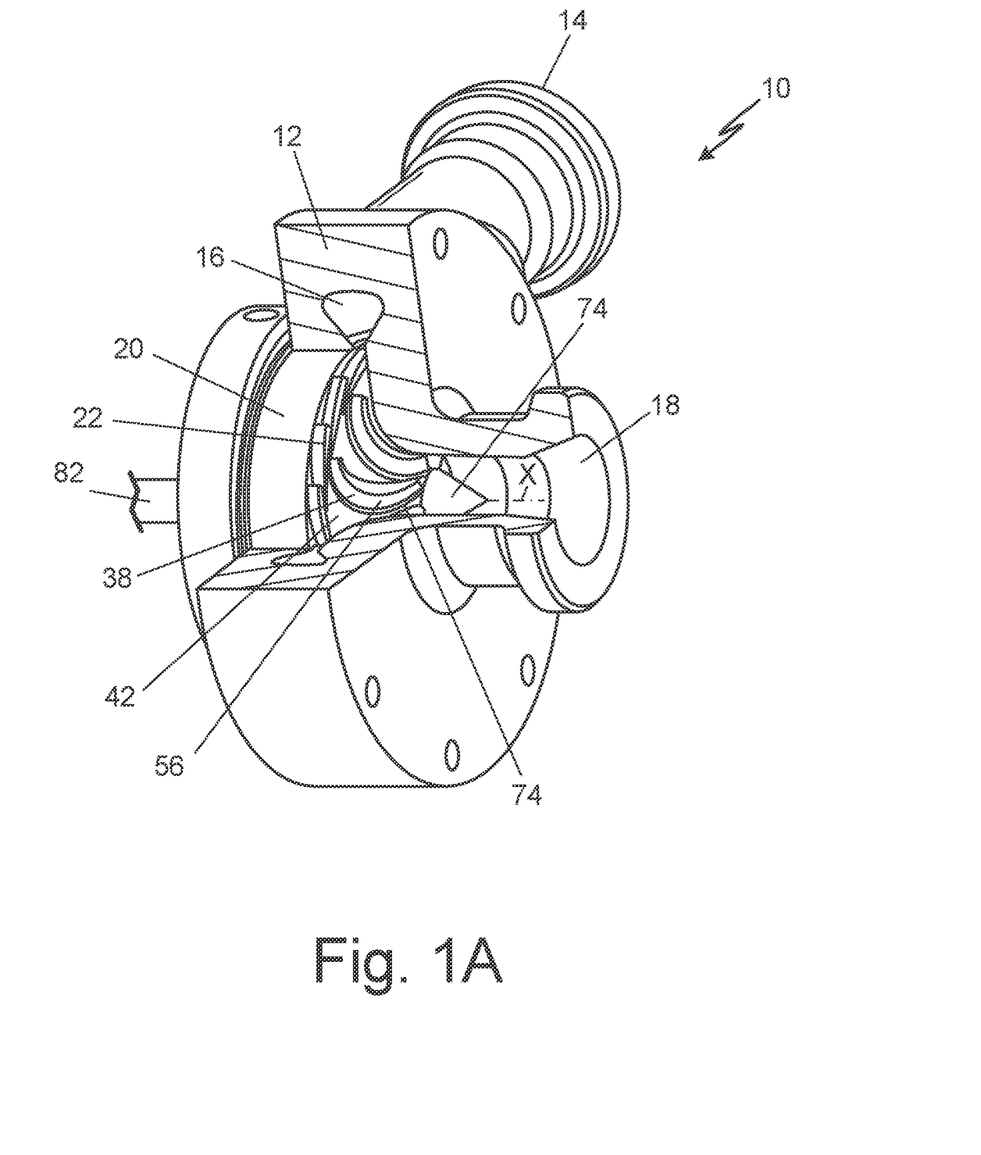
FIG. 1A is a partial cutaway perspective view of a turbine rotor within a primary housing and a secondary housing.

FIG. 1A is a partial cutaway perspective view of turbine rotor 38 within primary housing 12 and secondary housing 20. Radial turbine module 10 includes primary housing 12 (shown partially cut-away), secondary housing 20, turbine rotor 38 and shaft 82. Primary housing 12 includes inlet 14, volute 16, and outlet 18. Secondary housing 20 includes plurality of stators (or guide vanes) 22 (hereinafter referred to as "stators 22"). Turbine rotor 38 includes base 42, plurality of blades 56 (hereinafter referred to as "blades 56"), and central nose 74.

Primary housing 12 and secondary housing 20 surround turbine rotor 38. Shaft 82 extends through secondary housing 20 and attaches to turbine rotor 38 such that shaft 82 rotates within secondary housing 20 whenever turbine rotor 38 rotates within primary housing 12 and secondary housing 20. Stators 22 are formed on secondary housing 20 and extend axially from secondary housing 20.

High-pressure fluid enters primary housing 12 through inlet 14. Volute 16 distributes and directs high-pressure fluid from inlet 14 through stators 22. Stators 22 guide high-pressure fluid toward turbine rotor 38. As high-pressure fluid contacts blades 56 of turbine rotor 38 high pressure fluid causes turbine rotor 38 to rotate. High pressure fluid travels along base 42, blades 56, and central nose 74 and exits primary housing 12 through outlet 18. High-pressure fluid drives blades 56 such that turbine rotor 38 rotates about axis of rotation X along with shaft 82.

Figure 1B:
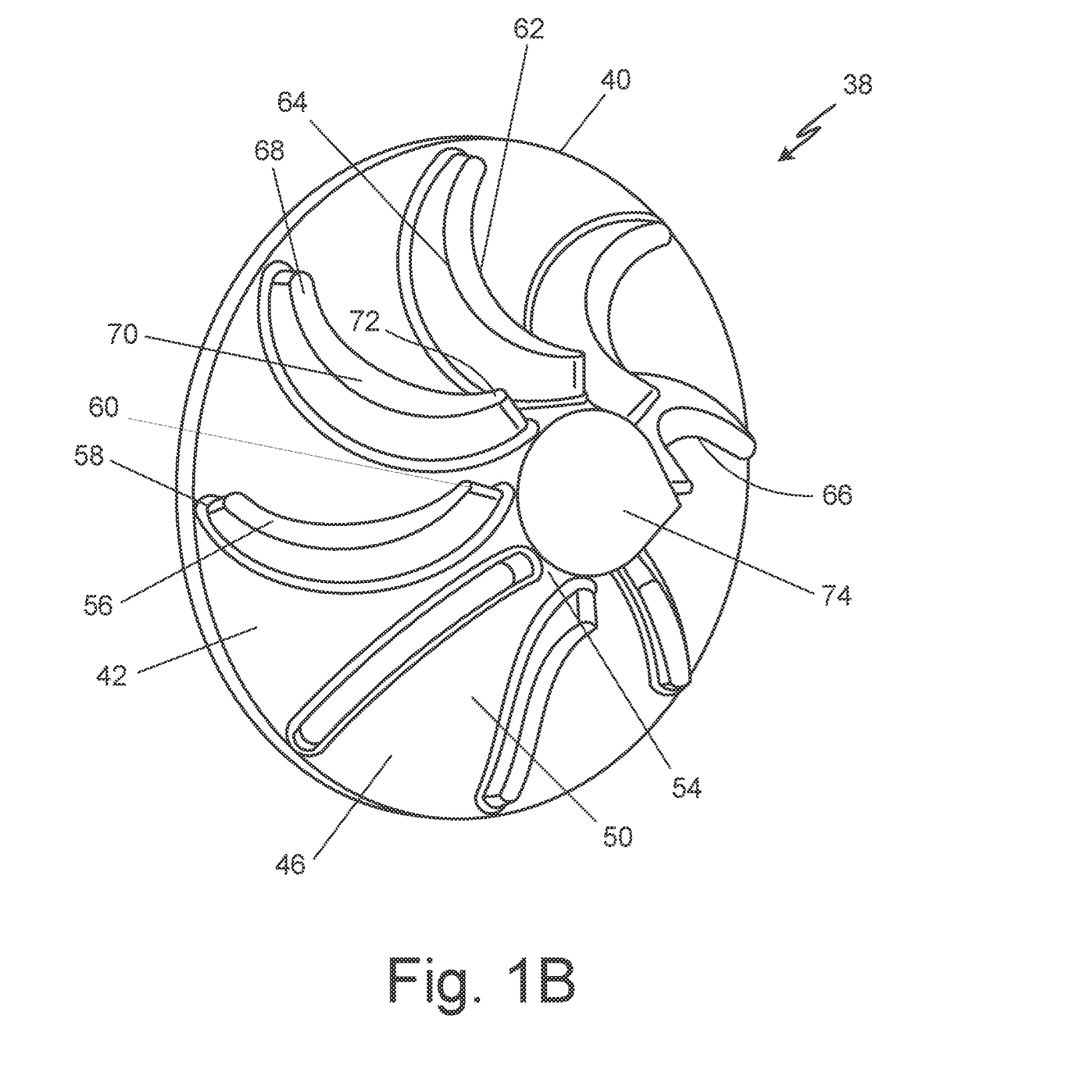
FIG. 1B is a perspective view showing the turbine rotor of FIG. 1A in isolation.

FIG. 1B is a perspective view showing turbine rotor 38 of FIG. 1A in isolation. Turbine rotor 38 includes radial outer edge 40. Base 42 includes radially outer portion 46, intermediate portion 50, and radially inner portion 54. Blades 56 include leading edge 58, trailing edge 60, pressure side 62, suction side 64, and tip 66. Leading edge 58 of blades 56 is proximate radially outer portion 46 of base 42. Trailing edge 60 of blades 56 is proximate radially inner portion 54 of base 42. Blades 56 include radially outward portion 68 near leading edge 58, radially inner portion 72 near trailing edge 60, and intermediate portion 70 situated between radially outward portion 68 and radially inner portion 72.

Blades 56 are circumferentially spaced about axis of rotation X and extend radially outward from base 42 to tip 66. Blades 56 also extend chordwise from leading edge 58 to trailing edge 60. Pressure side 62 of blades 56 is opposite of suction side 64 of blades 56. Base 42 curves such that radially outer portion 46 extends further in a radial direction than in an axial direction, and that radially inner portion 54 extends further in the axial direction than in the radial direction. Thus, intermediate portion 50 extends similarly in the radial direction and the axial direction. Blades 56 also curve such that radially outward portion 68 extends further in the radial direction than in the axial direction and that radially inner portion 72 extends further in the axial direction than in the radial direction. Thus, intermediate portion 70 extends similarly in the radial direction and the axial direction. Central nose 74 is radially inward of blades 56 and extends axially from base 42 defining axis of rotation X. In the example of FIG. 1B, central nose 74 is conical. In another non-limiting example, central nose 74 can be half-spherical, half-elliptic, or any other smooth bodies of revolution.

Figure 1C:
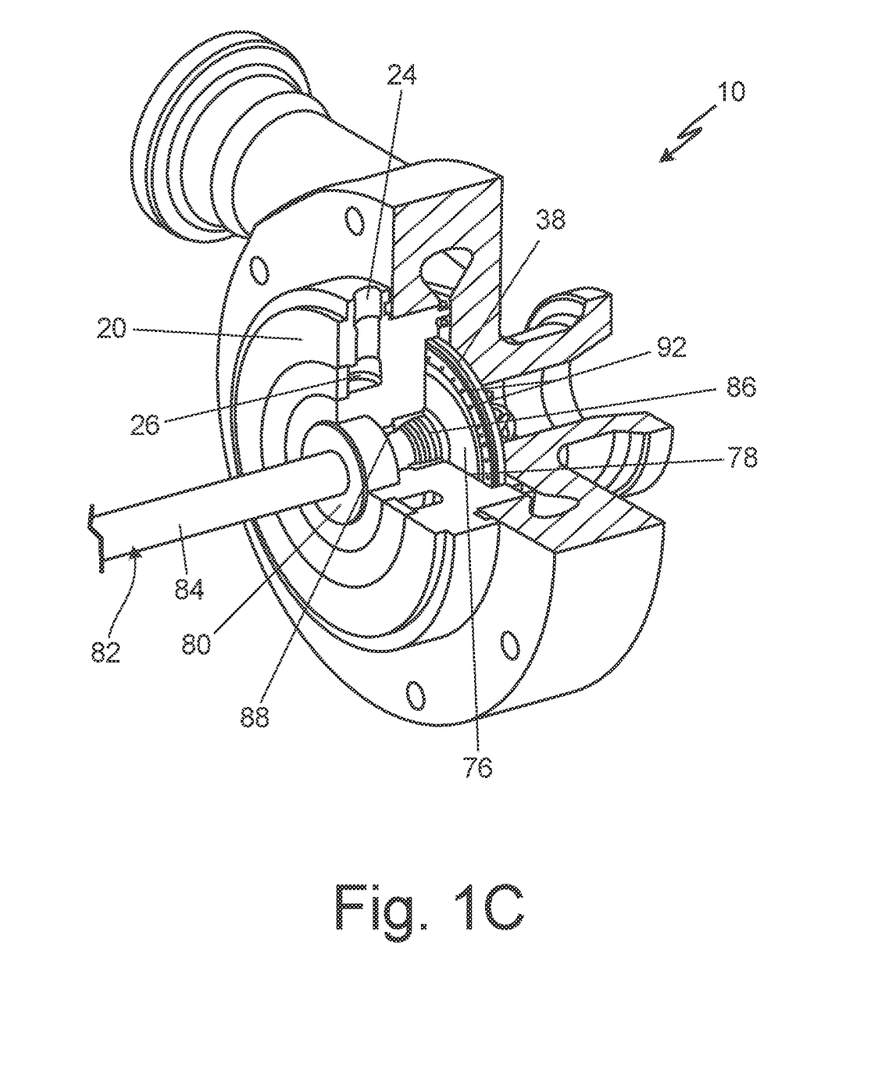
FIG. 1C is a cutaway perspective view showing a rear surface of the turbine rotor.

FIG. 1C is a cutaway perspective view showing rear surface 76 of turbine rotor 38. Impingement jets 92 extend through rear surface 76 of turbine rotor 38. Secondary housing 20 (shown partially cut-away) includes inlet 24 and primary cooling chamber 26. Secondary housing 20 and rear surface 76 of turbine rotor 38 define cooling gap 78. Secondary housing 20 also includes secondary cooling gap 88. As shown in FIG. 1C, radial turbine module 10 also includes bearing 80 and seal 86. Shaft 82 includes outer surface 84. Bearing 80 is disposed within secondary housing 20 and is configured to receive and align shaft 82 within primary housing 12 and secondary housing 20. Seal 86 fits on outer surface 84 of shaft 82. Seal 86 can be a labyrinth seal, a dry gas seal, or any other seal used to control flow within a turbine module. Secondary cooling gap 88 is between bearing 80 and seal 86. Seal 86 is configured to control the quantity of cooling fluid CF (first shown in FIG. 1D) that flows into secondary cooling gap 88 between outer surface 84 of shaft 82 and secondary housing 20 to cool bearing 80, and other components, such as a generator (not shown).

Figure 1D:
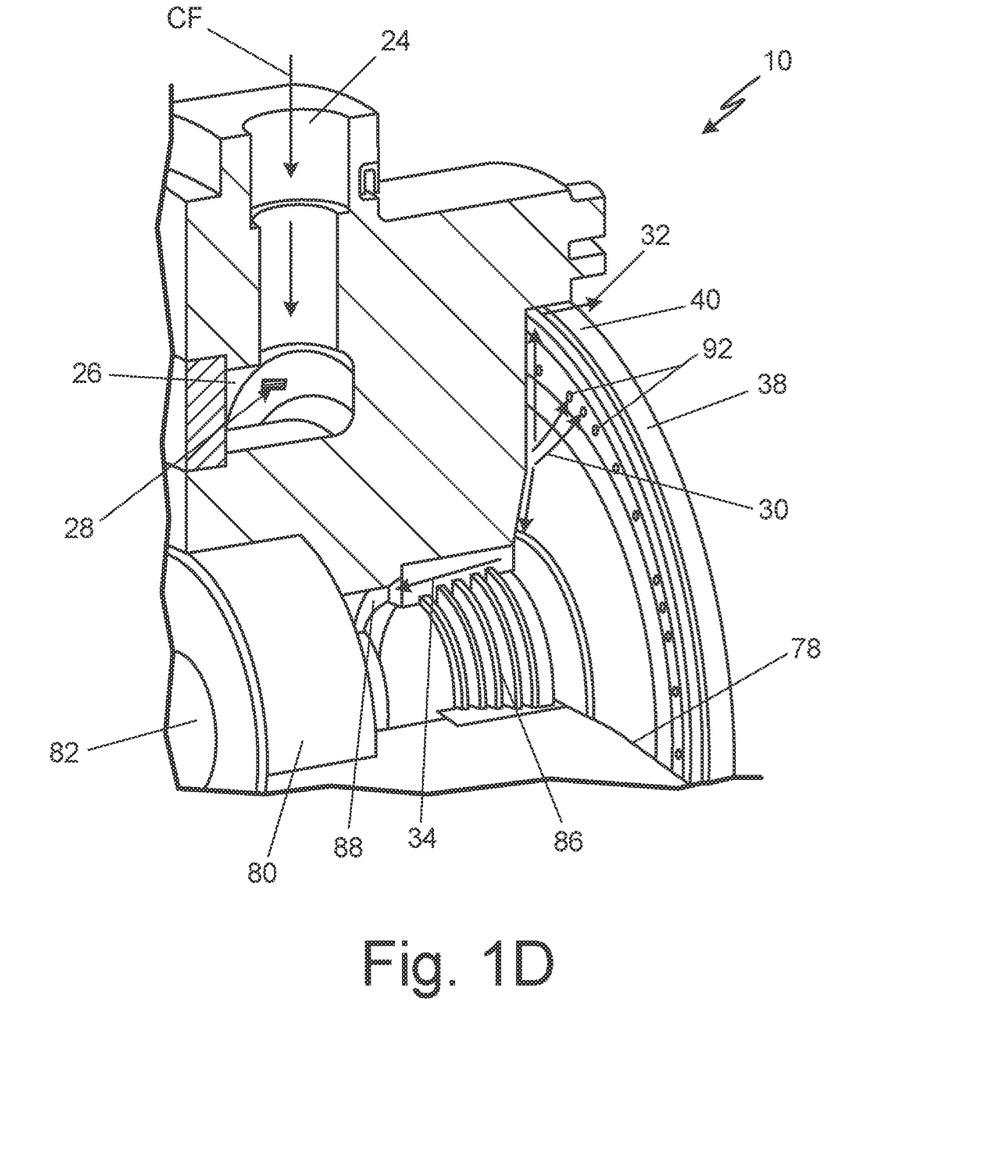
FIG. 1D is a partial cutaway perspective view showing the details of cooling fluid flow.

FIG. 1D is a partial cutaway perspective view showing the details of cooling fluid CF flow. Secondary housing 20 (shown partially cut-away) includes plurality of ports 28 (hereinafter referred to as "ports 28"). Cooling fluid CF can be obtained from a compressor or any other available high-pressure cold fluid and may be the same fluid as the turbine working fluid. In another example, cooling fluid CF could be a different fluid. The cooling fluid can be air, $CO_2$, supercritical $CO_2$, or any other fluid used for cooling. Advantageously, the cooling fluid can in some embodiments be identical to the working fluid of the turbine.

Ports 28 fluidically connect primary cooling chamber 26 and cooling gap 78. Cooling fluid CF flows into secondary housing 20 through inlet 24 and into primary cooling chamber 26. Cooling fluid CF flows from primary cooling chamber 26 and through ports 28 into cooling gap 78. Cooling fluid CF fills cooling gap 78 and cools turbine rotor 38 while within cooling gap 78.

Cooling fluid CF within cooling gap 78 splits into first portion 30, second portion 32, and third portion 34. First portion 30, second portion 32, and third portion 34 of cooling fluid CF work in concert to cool turbine rotor 38. First portion 30 of cooling fluid CF enters plurality of cooling manifolds (hereinafter referred to as "cooling manifolds 90") (first shown in FIG. 2A) through impingement jets 92. Second portion 32 of cooling fluid CF escapes cooling gap 78 along radial outer edge 40 of turbine rotor 38. The escaped cooling fluid CF along radial outer edge 40 of turbine rotor 38 helps cool turbine rotor 38 and helps prevent hot working fluid from infiltrating cooling gap 78. Third portion 34 of cooling fluid CF escapes cooling gap 78 around seal 86 and enters secondary cooling gap 88 between secondary housing 20 and outer surface 84 of shaft 82 to cool seal 86 and bearing 80.

Figure 2A:
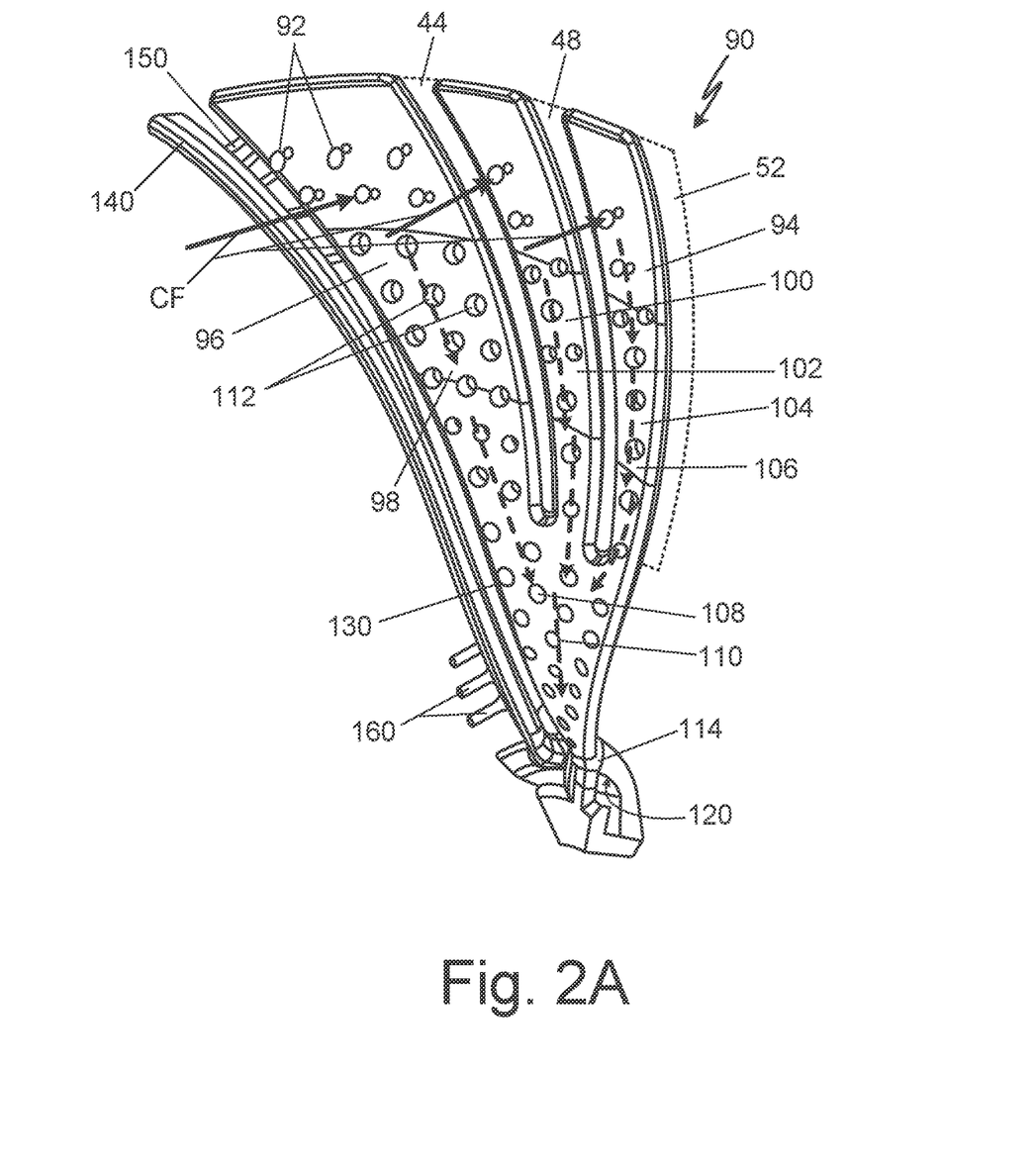
FIG. 2A is an inverse perspective view of a backside of a plurality of cooling manifolds within the turbine rotor.
Figure 2B:
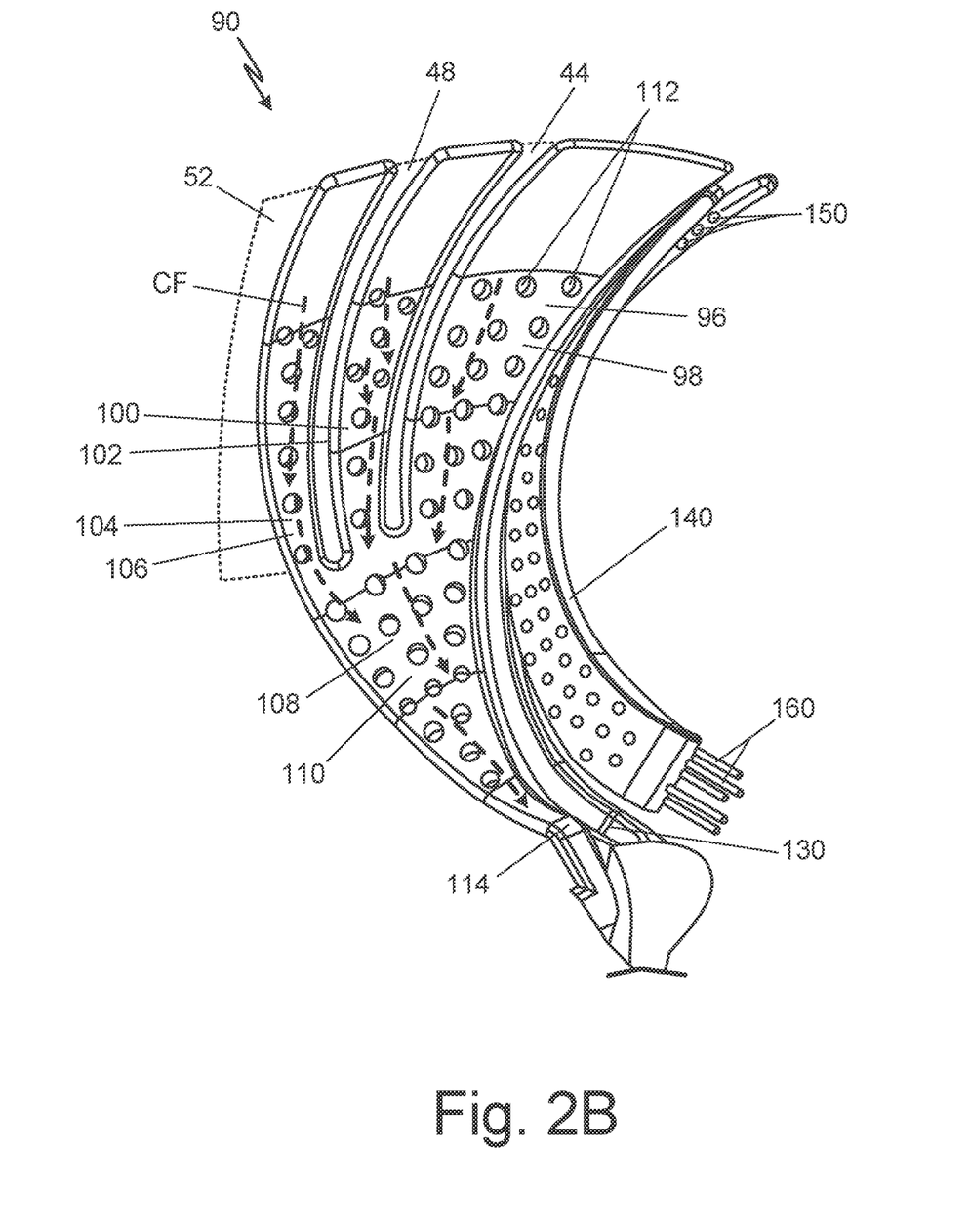
FIG. 2B is an inverse perspective view of the plurality of cooling manifolds.

FIGS. 2A-2B will be discussed concurrently to describe cooling manifolds 90. FIG. 2A is an inverse perspective view of a backside of cooling manifolds 90 within turbine rotor 38. FIG. 2B is an inverse perspective view of cooling manifolds 90. Turbine rotor 38 includes first support rib 44, second support rib 48, and third support rib 52. Cooling manifolds 90 include impingement jets 92, internal manifold 94, central nose manifold 120, base manifold 130, blade manifold 140, guide passages 150, and exit jets 160. Internal manifold 94 includes primary channel 96, secondary channel 100, tertiary channel 104, main channel 108, columns (or pins) 112, and internal manifold outlet 114. Primary channel 96 includes primary cooling void 98. Secondary channel 100 includes secondary cooling void 102. Tertiary channel 104 includes tertiary cooling void 106. Main channel 108 includes main cooling void 110.

Cooling manifolds 90 are disposed within turbine rotor 38. Internal manifold 94 extends radially inward of impingement jets 92 and extends between base 42 and rear surface 76 of turbine rotor 38 between adjacent blades 56 to cool base 42 and provide structural support within turbine rotor 38. Central nose manifold 120 extends into central nose 74 and cools central nose 74. Base manifold 130 extends radially outward from central nose manifold 120 along base 42 adjacent to suction side 64 blades 56 to cool base 42 and blades 56. Blade manifold 140 extends within blades 56 from base 42 to tip 66 of blades 56 and extends from leading edge 58 toward trailing edge 60 to cool blades 56 and supply structural support to blades 56.

As shown in FIGS. 1C-2B, impingement jets 92 are circumferentially disposed around and extend through rear surface 76 of turbine rotor 38. Impingement jets 92 also extend into internal manifold 94 to fluidically connect primary cooling chamber 26 and cooling manifolds 90. Specifically, impingement jets 92 fluidically connect primary cooling chamber 26 to primary channel 96, secondary channel 100, and tertiary channel 104 to fill primary cooling void 98, secondary cooling void 102, and tertiary cooling void 106 with cooling fluid CF.

Primary channel 96 is fluidically connected to impingement jets 92 and extend radially inward from impingement jets 92 between base 42 and rear surface 76 of turbine rotor 38. Primary channel 96 also extends along suction side 64 of blades 56. Secondary channel 100 extends radially inward from impingement jets 92 between base 42 and rear surface 76 of turbine rotor 38. Tertiary channel 104 extends radially inward from impingement jets 92 between base 42 and rear surface 76 of turbine rotor 38. Primary channel 96, secondary channel 100, and tertiary channel 104 combine to form main channel 108 at radially inward position before central nose manifold 120.

Primary channel 96 and primary cooling void 98 have a greater volume than secondary channel 100 and tertiary channel 104 to increase the cooling fluid CF within primary cooling void 98. The increase of cooling fluid CF within primary cooling void 98 increases the cooling that occurs within primary channel 96. In one example, primary channel 96 can be aligned within base 42 near the suction side 64 of blades 56. In another example, primary channel 96 can be aligned within base 42 near pressure side 62 of blades 56.

Primary cooling void 98, secondary cooling void 102, and tertiary cooling void 106 are in fluidic communication with one another and merge into main cooling void 110 within main channel 108. Columns 112 extend axially through and interrupt primary cooling void 98, secondary cooling void 102, tertiary cooling void 106, and main cooling void 110, and generate a high level of turbulence to enhance cooling. Moreover, columns 112 provide structural support within internal manifold 94 to prevent internal manifold 94 from collapsing and increases the surface area and Reynolds number between internal manifold 94 and cooling fluid CF within primary cooling void 98, secondary cooling void 102, tertiary cooling void 106, and main cooling void 110. The increased surface area and Reynolds number between internal manifold 94 and cooling fluid CF within primary cooling void 98, secondary cooling void 102, tertiary cooling void 106, and main cooling void 110 also improves the heat transfer between internal manifold 94 and cooling fluid CF.

First support rib 44 extends radially between primary channel 96 and secondary channel 100 until primary channel 96 and secondary channel 100 meet at main channel 108. Second support rib 48 extends radially between secondary channel 100 and tertiary channel 104 until secondary channel 100 and tertiary channel 104 meet at main channel 108. Third support rib 52 extends radially along tertiary channel 104 opposite second support rib 48 until tertiary channel 104 joins main channel 108. First support rib 44, second support rib 48, and third support rib 52 provide support to both internal manifold 94 and turbine rotor 38. Moreover, first support rib 44, second support rib 48, and third support rib 52 improve the heat transfer between turbine rotor 38 and internal manifold 94 because first support rib 44, second support rib 48, and third support rib 52 increase the surface area and Reynolds number between turbine rotor 38 and internal manifold 94.

Figure 2C:
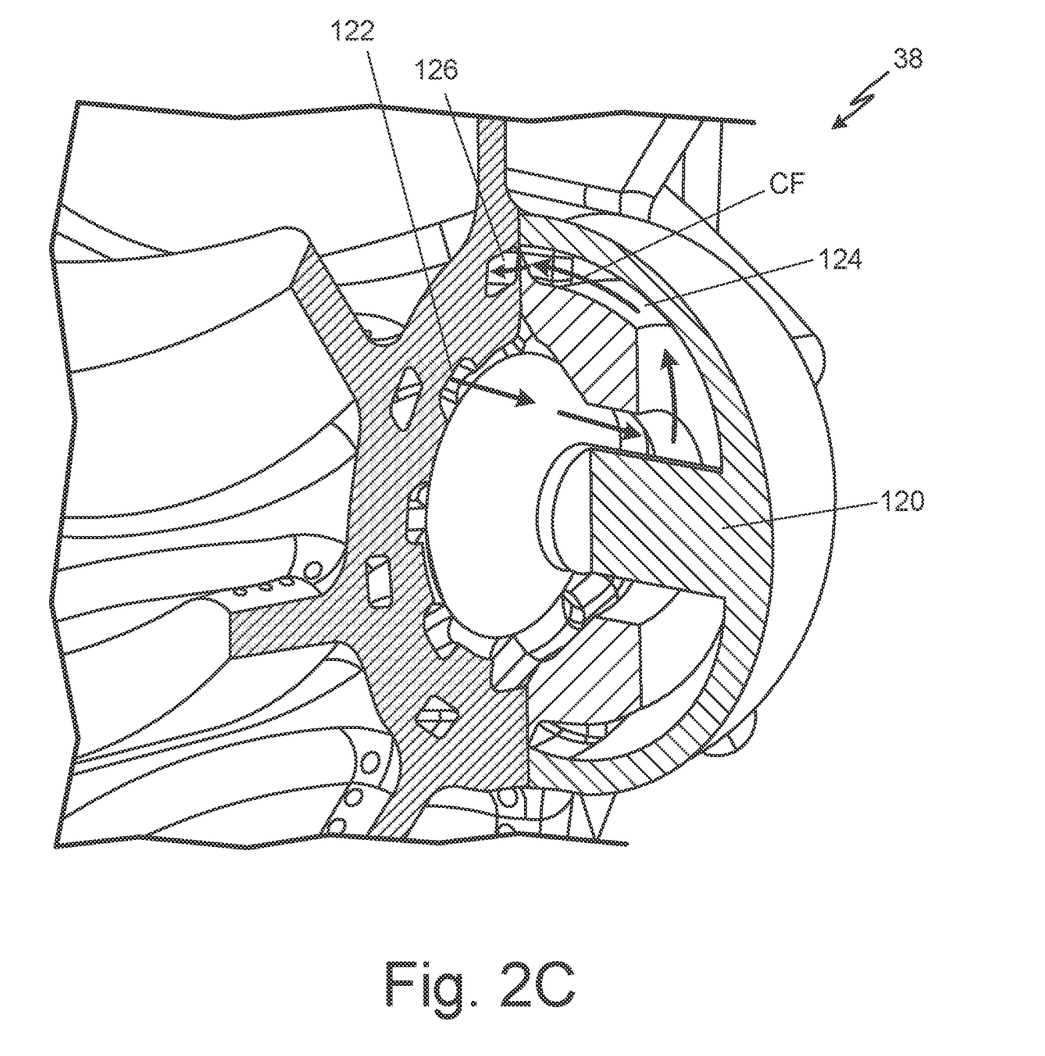
FIG. 2C is a simplified cutaway perspective view of a central nose manifold.

FIG. 2C is a simplified cutaway perspective view of central nose manifold 120. Central nose manifold 120 (shown partially cut-away) includes nose inlet 122, nose cooling void 124, and nose outlet 126. Nose inlet 122 is fluidically connected to internal manifold outlet 114. Cooling fluid CF flows into nose inlet 122 to fill nose cooling void 124 and cool central nose manifold 120. Cooling fluid CF leaves central nose manifold 120 through nose outlet 126.

Figure 2D:
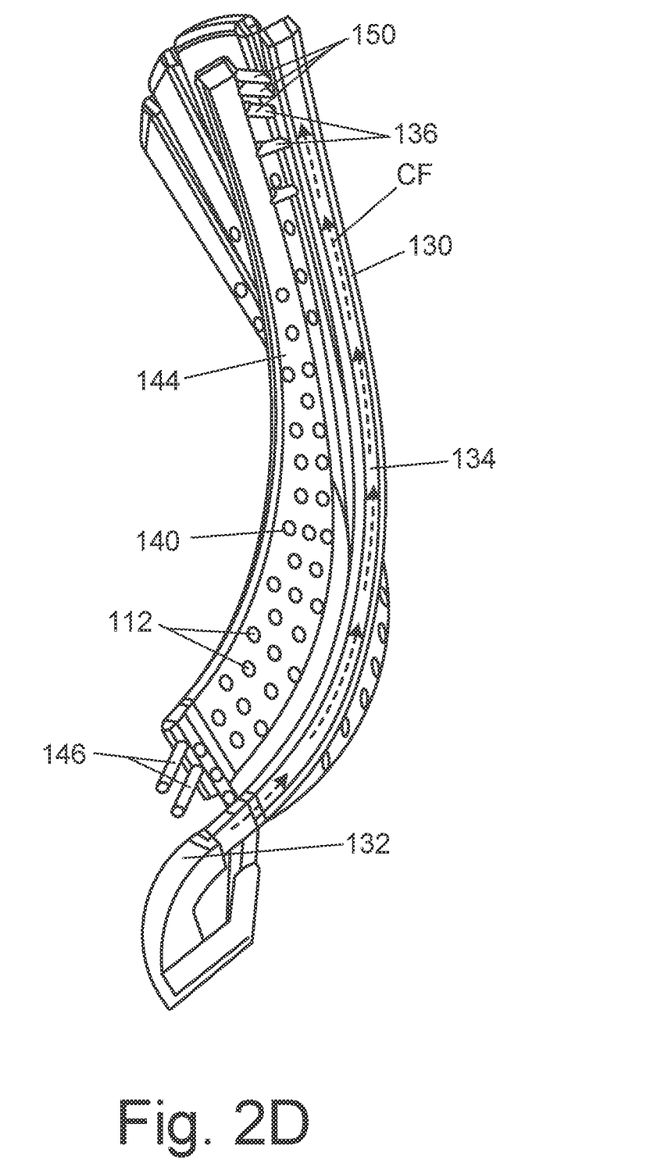
FIG. 2D is an inverse perspective view of a base manifold, a blade manifold, and a plurality of guide passages.
Figure 2E:
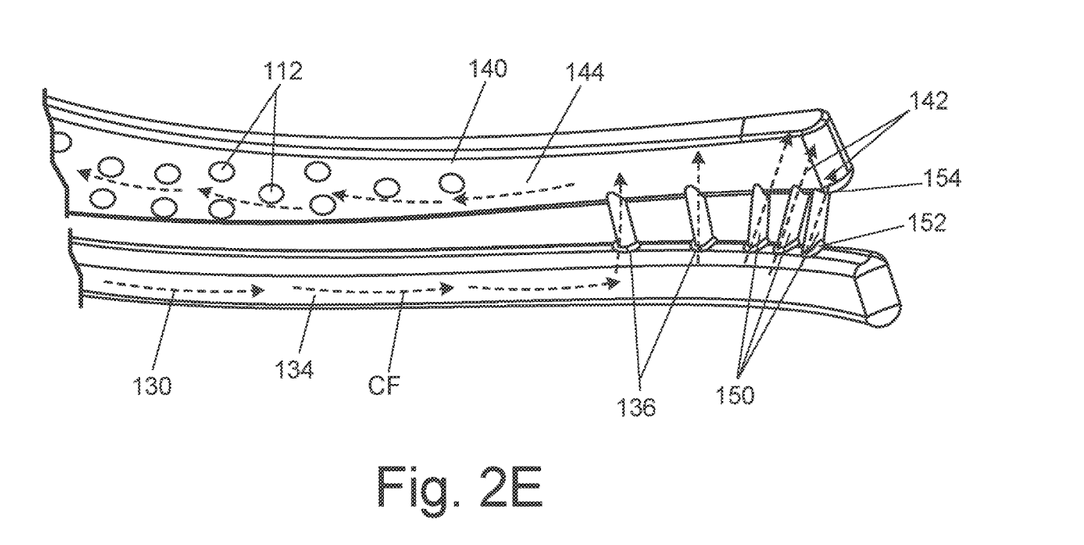
FIG. 2E is a close-up inverse perspective view showing the plurality of guide passages.

FIGS. 2D and 2E will be discussed concurrently. FIG. 2D is an inverse perspective view of base manifold 130, blade manifold 140, and guide passages 150. FIG. 2E is a close-up inverse perspective view showing guide passages 150. Base manifold 130 includes base inlet 132, base cooling void 134, and base outlet 136. Blade manifold 140 includes blade inlets 142, blade void 144, and blade outlet 146. Guide passages 150 include guide passage inlet 152 and guide passage outlet 154. In the present example, base manifold 130 and blade manifold 140 include columns 112 within base cooling void 134 and blade void 144, respectively. Columns 112 extend circumferentially within base cooling void 134 and blade void 144 to interrupt the flow of cooling fluid CF through base manifold 130 and blade manifold 140.

Base manifold 130 extends along base 42 beneath blades 56. Blade manifold 140 extend from base 42 and into blades 56 toward tip 66. Blade manifold 140 also extend within blades 56 from leading edge 58 toward trailing edge 60 along pressure side 62 of blades 56.

Columns 112 support base manifold 130 and blade manifold 140 and improve the heat transfer between cooling fluid CF within base cooling void 134 and blade void 144 and turbine rotor 38. In another example, base manifold 130 and blade manifold 140 can include walls (not shown) that define channels within base cooling void 134 and blade void 144. The walls provide structural support and increase the heat transfer between cooling fluid CF within base cooling void 134 and blade void 144 and turbine rotor 38. In another example, base manifold 130 and blade manifold 140 can include fins, pedestals, ribs, and or any other supports that provide structural support and improve heat transfer between a body and a working fluid.

Guide passages 150 are fluidically connected between base manifold 130 and blade manifold 140. Cooling fluid CF flows from nose outlet 126 and in through base inlet 132 to fill base cooling void 134 and cool turbine rotor 38. Cooling fluid CF leaves base manifold 130 through base outlet 136 and flows into guide passages 150 through guide passage inlet 152. Guide passages 150 extend from base manifold 130 to blade manifold 140. Guide passages 150 are angled to direct cooling fluid CF toward suction side 64 and leading edge 58 and towards tip 66 of blades 56. Cooling fluid CF leaves guide passages 150 through passage outlet 154 and enters blade manifold 140 through blade inlets 142 to fill blade void 144. Because guide passages 150 are angled to direct cooling fluid CF toward suction side 64 and leading edge 58 and toward tip 66 of blades 56 blade manifold 140 prioritizes cooling suction side 64 and leading edge 58 and towards tip 66 of blades 56. Cooling fluid CF then flows through blade void 144 and exits blade manifold 140 through blade outlet 146.

In the example shown in FIGS. 2A-2D, internal manifold 94 includes primary channel 96, secondary channel 100, and tertiary channel 104. In another example, internal manifold 94 can include primary channel 96 and at least one of secondary channel 100 and tertiary channel 104. In this example, primary channel 96 and at least one of secondary channel 100 and tertiary channel 104 combine to form main channel 108 at a radially inward position before central nose manifold 120. Additionally, in this example, the size of primary channel 96 and at least one of secondary channel 100 and tertiary channel 104 can be adjusted to change the heat transfer between internal manifold 94 and turbine rotor 38. For example, the total volume of primary cooling void 98 and at least one of secondary cooling void 102 and tertiary cooling void 106 can be increased to adjust the heat transfer between internal manifold 94 and turbine rotor 38.

Figure 2F:
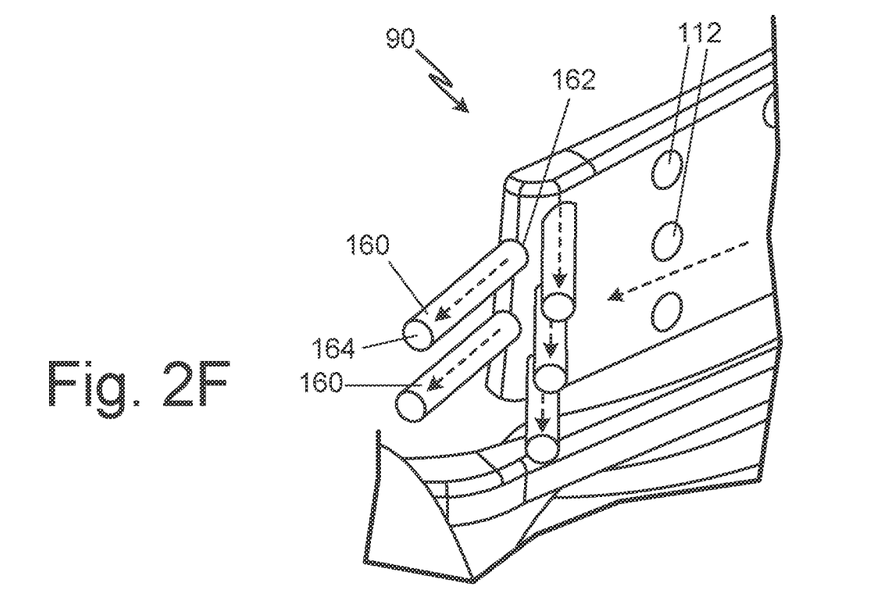
FIG. 2F is an inverse perspective view showing a plurality of exit jets.
Figure 2G:
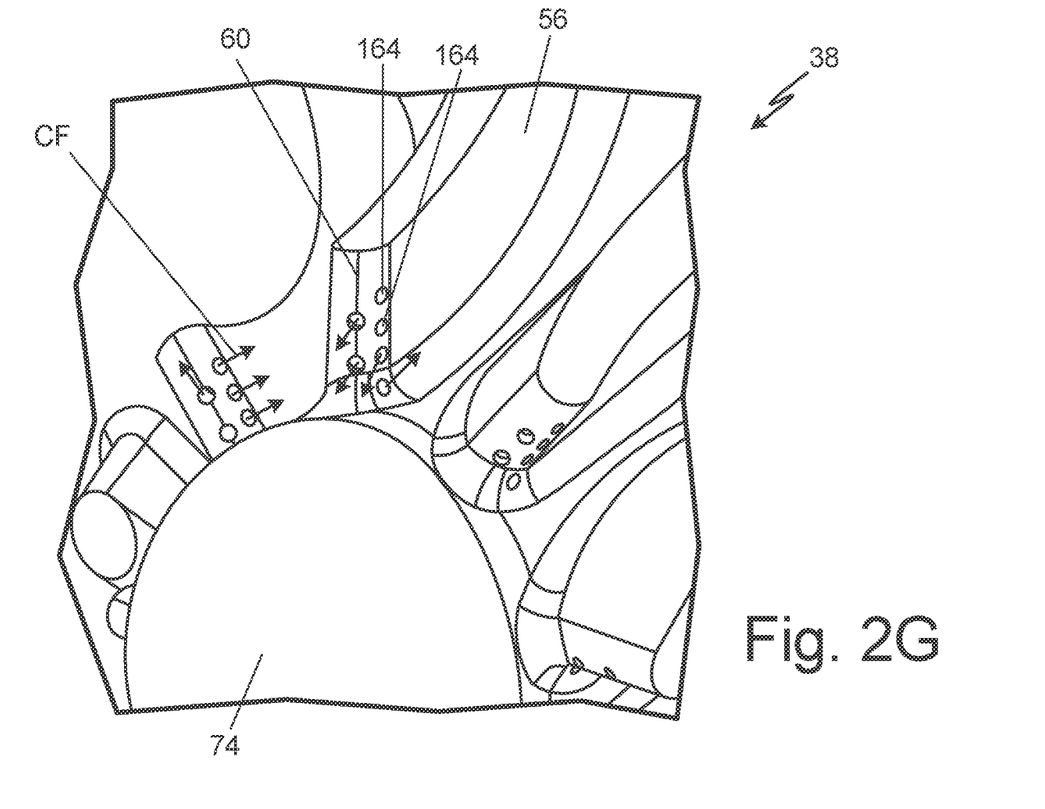
FIG. 2G is a perspective view showing the exit jets through a plurality of turbine rotor blades.

FIGS. 2F and 2G will be discussed concurrently. FIG. 2F is an inverse perspective view showing exit jets 160. FIG. 2G is a perspective view showing exit jets 160 extending through trailing edge 60 of blades 56. Exit jets 160 include jet inlet 162 and jet outlet 164. Exit jets 160 extend from blade manifold 140 and through trailing edge 60 of blades 56.

Exit jets 160 are fluidically connected to blade outlet 146 of blade manifold 140. Cooling fluid CF flows out of blade outlet 146 and into exit jets 160 through jet inlet 162. Jet inlet 162 and exit jets 160 have an area that is smaller than the area of blade manifold 140 toward trailing edge 60. The smaller area of jet inlet 162 and exit jets 160 create pressure drop and act as a nozzle that accelerates cooling fluid CF as it exits cooling manifolds 90 out of jet outlet 164 of exit jets 160. The acceleration of cooling fluid CF leaving jet outlet 164 helps prevent flow reversal of hot working fluid into cooling manifolds 90. Moreover, cooling fluid CF leaving cooling manifolds 90 through jet outlet 164 of exit jets 160 cools turbine rotor 38 and central nose 74 via film cooling at trailing edge 60 of blades 56.

Turbine rotor 38 as shown in FIGS. 1A-2G, can be manufactured using additive manufacturing techniques. More specifically, turbine rotor 38 can be manufactured using powder bed fusion in a layer-by-layer process. In one example, turbine rotor 38 can be made in a layer-by-layer process by starting with rear surface 76 of turbine rotor 38 and building turbine rotor 38 and cooling manifolds 90 in a layer-by-layer process ending with central nose 74 of turbine rotor 38. In another example, turbine rotor 38 can be made in a layer-by-layer process starting with central nose 74 and building turbine rotor 38 and cooling manifolds 90 in a layer-by-layer process ending with rear surface 76 of turbine rotor 38.

After turbine rotor 38 is additively manufactured, radial turbine module 10 can be assembled by installing turbine rotor 38 within primary housing 12 and installing secondary housing 20 such that stators 22 circumferentially surround turbine rotor 38. Bearing 80 is installed within secondary housing 20 and shaft is inserted through bearing 80 and seal 86 is installed onto shaft 82. Next, shaft 82 is inserted into turbine rotor 38 such that shaft 82 is coupled to turbine rotor 38 and shaft 82 is aligned within bearing 80 and seal 86 is between rear surface 76 of turbine rotor 38 and bearing 80.

DISCUSSION OF POSSIBLE EMBODIMENTS

The following are non-exclusive descriptions of possible embodiments of the present invention.

A turbine rotor of a radial flow turbine includes a base and a plurality of blades circumferentially spaced about an axis of rotation and extending from the base. Each blade extends radially outward from the base to a tip and chordwise from a leading edge to a trailing edge. Each blade has a suction side and a pressure side. A central nose is radially inward of the blades and defines an axis of rotation. A plurality of cooling manifolds is disposed within the turbine rotor and includes impingement cooling jets circumferentially disposed around and extending through a rear surface of the turbine rotor. An internal cooling manifold extends radially inward of the impingement cooling jets and extends between the base and the rear surface of the turbine rotor. A central nose cooling manifold extends into the central nose and is fluidically connected to the internal cooling manifold. A base cooling manifold is fluidically connected to the central nose manifold and extends radially outward from the central nose cooling manifold along the base adjacent to the suction side of the blade. A blade cooling manifold fluidically connected to the base cooling manifold extends within the blade from the base to the tip of the blade and extends from the leading edge toward the trailing edge of the blade. Trailing edge exit jets extend from the blade cooling manifold and through the trailing edge of each blade of the plurality of blades.

The turbine rotor of the preceding paragraph can optionally include, additionally and/or alternatively, any one or more of the following features, configurations and/or additional components:

the internal manifold includes a primary cooling channel fluidically connected to the impingement jets, extending radially inward from the impingement jets between the base and rear surface of the turbine rotor, and extending along the suction side of each blade of the plurality of blades; a secondary cooling channel fluidically connected to the impingement jets and extending radially inward the impingement jets between the base and the rear surface of the turbine rotor; and a tertiary cooling channel fluidically connected to the impingement jets and extending radially inward the impingement cooling jets between the base and the rear surface of the turbine rotor, wherein the primary cooling channel, the secondary cooling channel, and the tertiary cooling channel combine to form a main cooling channel at a radially inward position before the central cooling manifold;

each of the plurality of cooling manifolds comprises a cooling void interrupted by a plurality of columns extending axially within the primary cooling channel, the secondary cooling channel, and the tertiary cooling channel;

each of the cooling manifolds comprises a cooling void interrupted by a plurality of columns extending circumferentially within the base manifold and in blade manifold;

further including a plurality of guide passages fluidically connected between the base manifold and the blade manifold, wherein the plurality of guide passages extends from the base manifold to the blade manifold, and wherein each of the plurality of guide passages is angled from the base manifold towards the suction side of the blade and the tip of the blade at the leading edge of the blade;

further including a first support rib extending radially between the primary cooling channel and the secondary cooling channel until the primary cooling channel and the secondary cooling channel meet at main cooling channel; a second support rib extending radially between the secondary cooling channel and the tertiary cooling channel until the secondary cooling channel and the tertiary cooling channel meet at the main cooling channel; and a third support rib extending radially along the tertiary cooling channel opposite the second support rib until the tertiary cooling channel joins the main cooling channel; and/or the turbine rotor is additively manufactured.

A turbine module includes a turbine rotor and a housing. The turbine rotor includes a base and a plurality of blades circumferentially spaced about an axis of rotation and extending from the base. Each blade extends radially outward from the base to a tip and chordwise from a leading edge to a trailing edge. Each blade also has a suction side and a pressure side. The base and the blades curve such that radially outward portions of the base and the blades extend more in a radial direction than in an axial direction. Radially central portions of the base and the blades extend similarly in the radial direction and the axial direction. A central nose radially inward of the plurality of blades defines the axis of rotation. A plurality of cooling manifolds are disposed within the turbine rotor. The cooling manifolds include impingement cooling jets circumferentially disposed around and extending through a rear surface of the turbine rotor. An internal cooling manifold extends radially inward of the impingement cooling jets and extends between the base and the rear surface of the turbine rotor. A central nose cooling manifold extends into the central nose and is fluidically connected to the internal cooling manifold. A base cooling manifold is fluidically connected to the central nose manifold and extends radially outward from the central nose cooling manifold along the base adjacent the suction side of the blade. A blade cooling manifold is fluidically connected to the base cooling manifold extends within the blade from the base to tip of the blade and extends from the leading edge toward the trailing edge of the blade. Trailing edge exit jets extend from the blade cooling manifold and through the trailing edge of the blades. The housing includes a shaft mounted within the housing. The housing and a rear surface of the turbine rotor define a cooling gap.

The turbine module of the preceding paragraph can optionally include, additionally and/or alternatively, any one or more of the following features, configurations and/or additional components:

the internal manifold is comprised of: a primary cooling channel fluidically connected to the impingement jets and extending radially inward the impingement jets between the base and rear surface of the turbine rotor and extending along the suction side of each blade of the plurality of blades, and at least one of: a secondary cooling channel fluidically connected to the impingement jets and extending radially inward the impingement jets between the base and the rear surface of the turbine rotor; and a tertiary cooling channel fluidically connected to the impingement jets and extending radially inward the impingement jets between the base and the rear surface of the turbine rotor, wherein the primary cooling channel and the at least one of the secondary cooling channel the tertiary cooling channel combine to form a main cooling channel at a radially inward position before the central nose manifold;

each of the plurality of cooling manifolds comprises a cooling void interrupted by a plurality of pins extending axially within the primary cooling channel, the secondary cooling channel, and the tertiary cooling channel;

each of the plurality of cooling manifolds comprises a cooling void interrupted by a plurality of pins extending circumferentially within the base manifold and in blade manifold;

further including a plurality of guide passages fluidically connected between the base manifold and the blade manifold, wherein each of the plurality of guide passages extends from the base manifold to the blade manifold, and wherein each of the plurality of guide passages is angled from the base manifold towards the suction side of the blade and the tip of the blade at the leading edge of the blade;

further including a plurality of guide passages fluidically connected between the base manifold and the blade manifold, wherein each of the plurality of guide passages extends from the base manifold to the blade manifold, and wherein each of the plurality of guide passages is angled from the base manifold towards the suction side of the blade and the tip of the blade at the leading edge of the blade;

further including a first support rib extending radially between the primary cooling channel and the secondary cooling channel until the primary cooling channel and the secondary cooling channel meet at main cooling channel; a second support rib extending radially between the secondary cooling channel and the tertiary cooling channel until the secondary cooling channel and the tertiary cooling channel meet at the main cooling channel; and a third support rib extending radially along the tertiary cooling channel opposite the second support rib until the tertiary cooling channel joins the main cooling channel;

the shaft includes a seal on the shaft between a bearing and the rear surface of the turbine rotor;

the housing further includes a cooling inlet that extends through the housing and is fluidically connected to the cooling gap, wherein a cooling fluid enters the housing through the cooling inlet and fills the cooling gap;

a first portion of the cooling fluid enters the internal cooling manifold through the impingement jets and flows through the primary cooling channel, the secondary cooling channel and the tertiary fluid channel before combining in the main cooling channel, the cooling fluid from the main cooling channel flows through the central nose manifold and into the base manifold, the cooling fluid from the base manifold flows through the plurality of guide passages and into the blade manifold contacting the blade manifold contiguous with the suction side of the blade, and the cooling fluid from the blade manifold flows through the trailing edge exit jets and exits the internal manifold at the trailing edge of the blade to provide film cooling at the trailing edge of the blade;

a second portion of the cooling fluid enters escapes the cooling gap along the radial edge of the rotor blade to cool the rotor blade and prevent a working fluid of the turbine module from reaching the cooling gap; and/or a third portion of the cooling fluid escapes the cooling gap around the seal and enters a second cooling gap between the housing and an outer surface of the shaft to cool the seal and the bearing.

A method of making the turbine rotor of claim 1, wherein the method includes: forming the turbine rotor in a layer-by-layer additive manufacturing process; and the turbine rotor is installed into a turbine module that includes: a housing surrounding the turbine rotor, wherein the housing comprises a working fluid inlet, a volute, and a working fluid outlet, wherein the working fluid inlet, the volute, and the working fluid outlet are fluidically connected; a plurality of guide vanes configured to receive the working fluid from the volute and guide the working fluid to the turbine rotor; a shaft extending through the housing and mechanically coupled to the turbine rotor; a bearing that aligns the shaft; and a seal installed on the shaft between the bearing and a rear surface of the turbine rotor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine rotor of a radial flow turbine, the turbine rotor comprising:
   a base;
   a plurality of blades circumferentially spaced about an axis of rotation and extending from the base, each of the plurality of blades extending radially outward from the base to a tip and chordwise from a leading edge to a trailing edge, each of the plurality of blades having a suction side and a pressure side;
   a central nose radially inward of the plurality of blades, wherein the central nose defines the axis of rotation; and
   a plurality of cooling manifolds disposed within the turbine rotor, wherein the plurality of cooling manifolds comprises:
      impingement jets circumferentially disposed around and extending through a rear surface of the turbine rotor;
      an internal manifold extending radially inward of the impingement jets and extending between the base and the rear surface of the turbine rotor;
      a central nose manifold extending into the central nose, and fluidically connected to the internal manifold;
      a base manifold fluidically connected to the central nose manifold and extending radially outwardly from the central nose manifold along the base adjacent the suction side of each blade;
      a blade manifold fluidically connected to the base manifold extending within each blade from the base to the tip of each blade and extending from the leading edge toward the trailing edge of each blade; and
      a plurality of exit jets extending from the blade manifold and through the trailing edge of each blade of the plurality of blades.

2. The turbine rotor of claim 1, wherein the internal manifold comprises:
   a primary cooling channel fluidically connected to the impingement jets, extending radially inward from the impingement jets between the base and rear surface of the turbine rotor, and extending along the suction side of each blade of the plurality of blades;
   a secondary cooling channel fluidically connected to the impingement jets and extending radially inward the impingement jets between the base and the rear surface of the turbine rotor; and
   a tertiary cooling channel fluidically connected to the impingement jets and extending radially inward the impingement cooling jets between the base and the rear surface of the turbine rotor,
   wherein the primary cooling channel, the secondary cooling channel, and the tertiary cooling channel combine to form a main cooling channel at a radially inward position before the central nose manifold.

3. The turbine rotor of claim 2, wherein each of the plurality of cooling manifolds comprises a cooling void interrupted by a plurality of columns extending axially within the primary cooling channel, the secondary cooling channel, and the tertiary cooling channel.

4. The turbine rotor of claim 3, wherein each of the cooling manifolds comprises a cooling void interrupted by a plurality of columns extending circumferentially within the base manifold and in the blade manifold.

5. The turbine rotor of claim 4, further comprising:
   a plurality of guide passages fluidically connected between the base manifold and the blade manifold, wherein the plurality of guide passages extends from the base manifold to the blade manifold, and wherein each of the plurality of guide passages is angled from the base manifold towards the suction side of each blade, the leading edge of each blade, and the tip of each blade.

6. The turbine rotor of claim 5, further comprising:
   a first support rib extending radially between the primary cooling channel and the secondary cooling channel until the primary cooling channel and the secondary cooling channel meet at the main cooling channel;
   a second support rib extending radially between the secondary cooling channel and the tertiary cooling channel until the secondary cooling channel and the tertiary cooling channel meet at the main cooling channel; and
   a third support rib extending radially along the tertiary cooling channel opposite the second support rib until the tertiary cooling channel joins the main cooling channel.

7. The turbine rotor of claim 6, wherein the turbine rotor is additively manufactured.

8. A method of making the turbine rotor of claim 1, wherein the method comprises:
   forming the turbine rotor via layer-by-layer additive manufacturing.

9. The method of claim 8, wherein the turbine rotor is installed into a turbine module that comprises:
   a housing surrounding the turbine rotor, wherein the housing comprises a working fluid inlet, a volute, and a working fluid outlet, wherein the working fluid inlet, the volute, and the working fluid outlet are fluidically connected;
   a plurality of guide vanes configured to receive the working fluid from the volute and guide the working fluid to the turbine rotor;

a shaft extending through the housing and mechanically coupled to the turbine rotor;
a bearing that aligns the shaft; and
a seal installed on the shaft between the bearing and the rear surface of the turbine rotor.

10. A turbine module comprising:
a turbine rotor, wherein the turbine rotor comprises:
   a base;
   a plurality of blades circumferentially spaced about an axis of rotation and extending from the base, each of the plurality of blades extending radially outward from the base to a tip and chordwise from a leading edge to a trailing edge, each of the plurality of blades having a suction side and a pressure side, the base and each of the plurality of blades curve such that radially outward portions of the base and the plurality of blades extend more in a radial direction than in an axial direction, and radially central portions of the base and the plurality of blades extend similarly in the radial direction and the axial direction;
   a central nose radially inward of the plurality of blades, wherein the central nose defines the axis of rotation;
   a plurality of cooling manifolds disposed within the turbine rotor, wherein the plurality of cooling manifolds comprises:
      impingement jets circumferentially disposed around and extending through a rear surface of the turbine rotor;
      an internal manifold extending radially inward of the impingement jets and extending between the base and the rear surface of the turbine rotor;
      a central nose manifold extending into the central nose and fluidically connected to the internal manifold;
      a base manifold fluidically connected to the central nose manifold and extending radially outwardly from the central nose manifold along the base adjacent the suction side of each blade;
      a blade manifold fluidically connected to the base manifold extending within each blade from the base to the tip of each blade and extending from the leading edge toward the trailing edge of each blade; and
      a plurality of exit jets extending from the blade manifold and through the trailing edge of each blade of the plurality of blades; and
a housing surrounding the turbine rotor, wherein the housing comprises:
   a shaft mounted within the housing, wherein the housing and a rear surface of the turbine rotor define a cooling gap.

11. The turbine module of claim 10, wherein the internal manifold is comprised of:
a primary cooling channel fluidically connected to the impingement jets and extending radially inward from the impingement jets between the base and rear surface of the turbine rotor and extending along the suction side of each blade of the plurality of blades, and at least one of:
   a secondary cooling channel fluidically connected to the impingement jets and extending radially inward the impingement jets between the base and the rear surface of the turbine rotor; and
   a tertiary cooling channel fluidically connected to the impingement jets and extending radially inward the impingement jets between the base and the rear surface of the turbine rotor, wherein the primary cooling channel and the at least one of the secondary cooling channel the tertiary cooling channel combine to form a main cooling channel at a radially inward position before the central nose manifold.

12. The turbine module of claim 11, wherein each of the plurality of cooling manifolds comprises a cooling void interrupted by a plurality of pins extending axially within the primary cooling channel, the secondary cooling channel, and the tertiary cooling channel.

13. The turbine module of claim 12, wherein each of the plurality of cooling manifolds comprises a cooling void interrupted by a plurality of pins extending circumferentially within the base manifold and in the blade manifold.

14. The turbine module of claim 13, further comprising:
a plurality of guide passages fluidically connected between the base manifold and the blade manifold, wherein each of the plurality of guide passages extends from the base manifold to the blade manifold, and wherein each of the plurality of guide passages is angled from the base manifold towards the suction side of each blade, the leading edge of each blade, and the tip of each blade.

15. The turbine module of claim 14, further comprising:
a first support rib extending radially between the primary cooling channel and the secondary cooling channel until the primary cooling channel and the secondary cooling channel meet at the main cooling channel;
a second support rib extending radially between the secondary cooling channel and the tertiary cooling channel until the secondary cooling channel and the tertiary cooling channel meet at the main cooling channel; and
a third support rib extending radially along the tertiary cooling channel opposite the second support rib until the tertiary cooling channel joins the main cooling channel.

16. The turbine module of claim 15, wherein the shaft comprises:
a seal on the shaft between a bearing and the rear surface of the turbine rotor.

17. The turbine module of claim 16, wherein the housing further comprises:
a cooling inlet that extends through the housing and is fluidically connected to the cooling gap, wherein a cooling fluid enters the housing through the cooling inlet and fills the cooling gap.

18. The turbine module of claim 17, wherein:
a first portion of the cooling fluid enters the plurality of cooling manifolds through the impingement jets and flows through the primary cooling channel, the secondary cooling channel and the tertiary fluid channel before combining in the main cooling channel,
the cooling fluid from the main cooling channel flows through the central nose manifold and into the base manifold,
the cooling fluid from the base manifold flows through the plurality of guide passages and into the blade manifold contacting the blade manifold contiguous with the suction side of the blade, and
the cooling fluid from the blade manifold flows through the trailing edge exit jets and exits the internal manifold at the trailing edge of each blade to provide film cooling at the trailing edge of each blade.

19. The turbine module of claim 18, wherein a second portion of the cooling fluid exits the cooling gap along a radial edge of each blade to cool each blade and prevent a working fluid of the turbine module from reaching the cooling gap.

20. The turbine module of claim 19, wherein a third portion of the cooling fluid exits the cooling gap around the seal and enters a second cooling gap between the housing and an outer surface of the shaft to cool the seal and the bearing.

\* \* \* \* \*